United States Patent [19]
Spence

[11] 3,786,495
[45] Jan. 15, 1974

[54] STORED CHARGE TRANSDUCER

[75] Inventor: Wendell Spence, Dayton, Ohio

[73] Assignee: The National Cash Register Company, Dayton, Ohio

[22] Filed: May 17, 1972

[21] Appl. No.: 255,300

[52] U.S. Cl. ......... 340/365 C, 29/592, 178/DIG. 10, 179/111 E, 307/88 ET
[51] Int. Cl. ............................................ G06f 3/02
[58] Field of Search ................................ 340/365 C; 307/88 ET; 179/111 E; 178/DIG. 10; 252/63.5; 29/592

[56] References Cited

UNITED STATES PATENTS

| | | | |
|---|---|---|---|
| 3,668,698 | 6/1972 | Demirdjioghiou | 340/365 C |
| 3,653,038 | 3/1972 | Webb et al. | 340/365 C |
| 3,668,417 | 6/1972 | Sessler et al. | 340/365 C |
| 3,445,824 | 5/1969 | Fulenwider | 307/88 ET |
| 3,705,312 | 12/1972 | Sessler et al. | 307/88 ET |

*Primary Examiner*—John W. Caldwell
*Assistant Examiner*—Robert J. Mooney
*Attorney*—J. T. Cavender et al.

[57] ABSTRACT

A transducer for converting mechanical energy to electrical energy is described. The transducer utilizes the charge trapping characteristics of a silicon-oxide silicon-nitride interface to create an electric field between a solid conductor and a flexible conductor. As the flexible conductor changes due to mechanical forces applied thereto, the dimensions of the gap correspondingly change and the voltage thereacross changes, thereby providing a voltage corresponding to the mechanical motion of the flexible conductor.

16 Claims, 3 Drawing Figures

STORED CHARGE TRANSDUCER

This invention relates to a transducer, and more particularly a transducer for converting mechanical energy into a corresponding voltage.

In recent years a transducer capable of converting mechanical energy such as a sound wave into a corresponding electric energy has been described in several articles, such as the one entitled "Foil-Electret Microphones" by G. M. Sessler and J. E. West, in Volume 40 of The Journal of the Acoustical Society of America, at page 1433 (1966). The electret described in this article has a flexible metalized insulator layer electrode stretched across a conductive backplate. The insulator layer portion of the flexible electrode is polarized to create an electric field in the gap which is inherent between the flexible insulator layer electrode and the backplate. As the flexible electrode moves in response to mechanical forces, such as sound waves, the capacitance between the metalized portion and the backplate changes, thereby causing a voltage change between these conductors. One problem with this electret is the small amount of charge density which can be obtained by polarizing the insulator layer of the flexible electrode, for instance $10^{-8}$ coulombs/cm$^2$. This results in low sensitivity and hence, expensive detecting equipment is needed. Also the method of polarizing the insulator layer is difficult, as evidenced by the complicated process described in U.S. Pat. No. 3,612,778 entitled "Electret Acoustical Transducer and Method of Making" by Preston V. Murphy.

It is therefore desirable to have a transducer of the electret type which has a larger charge density and which may be fabricated using known thin film semiconductor techniques and batch fabrication to thereby greatly reduce the cost. This may be accomplished where the insulator layer is a material which traps electric charge therein, such as the silicon-oxide silicon-nitride interface, wellknown in the art.

In accordance with one aspect of this invention, there is provided a transducer comprising a layer of insulator having the capability of storing an electric charge over a substantial period of time, and first and second layers of conductor material separated by a gap. At least one of the conductor material layers is flexible and the other one of the conductor material layers is affixed to the insulator layer.

One embodiment of this invention is hereinafter described in detail with reference being made to the following FIGURES, in which.

Figure 1:
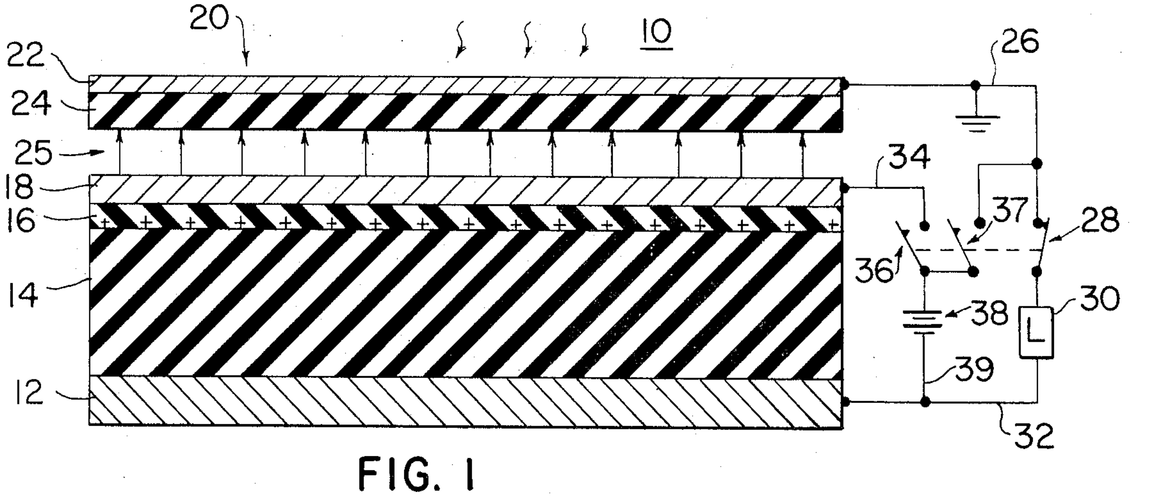
FIG. 1 shows a transducer of the type contemplated by this invention.

Referring now to FIG. 1, a transducer device 10 is shown. Transducer 10 includes a counter electrode 12 which may be either a solid conductor such as aluminum, a semiconductor such as silicon, or a metalized insulator. Counter electrode 12 may be of any desirable thickness, such as between 500 A and 1 inch, or more.

Affixed to counter electrode 12 is a lower insulator layer 14, such as silicon-oxide. Insulator layer 14 may be affixed to counter electrode 12 by several known techniques, such as thermal growth, vacuum evaporation, sputtering and so forth. Affixed to silicon-oxide layer 14 is an upper insulator layer 16, such as silicon-nitride which again may be affixed by the known techniques such as pryolytic deposition, vacuum evaporation, sputtering and so forth. The thickness of lower layer 14 is much greater than the thickness of upper layer 16. For instance, the thickness of lower layer 14 is greater than 1 micron and the thickness of upper layer 16 is between 100 and 300 A. It should be noted that upper layer 16 may be silicon-oxide and lower layer 14 may be silicon-nitride, if desired.

Affixed to upper layer 16 is a write electrode conductive layer 18 of a material such as aluminum. Write electrode 18 may be of any desired thickness which will conduct electric current, such as between 100 A and 5000 A.

A flexible electrode 20, such as a metalized insulator, is placed over write electrode 18. Flexible electrode 20 may include a conductor portion 22 such as aluminum or silver, and an insulator layer 24 such as mylar, polyester, or fluorocarbon. The thickness of flexible electrode 20 may be in the order of 10 microns. When flexible electrode 20 is placed over conductor 18, an air gap 25 exists therebetween due to surface irregularities between insulator layer 24 and write electrode 18. Air gap 25 exists even though no special effort is made to cause its existence.

To operate transducer device 10, an electric connection through grounded lead 26 is made between the metalized layer 22 of flexible electrode 20 and one terminal of a switch 28. The switching arm of switch 28 is connected to one end of a load 30, the other end of which is connected to counter electrode 12 through lead 32. A lead 34 is connected between write electrode 18 and one terminal of a switch 36. The switching arm of switch 36 is connected to the positive side of battery 38 and the negative side of the battery 38 is connected through lead 39 to counter electrode 12. Grounded lead 26 is also connected to one terminal of switch 37. The switching arm of switch 37 is connected to the positive side of battery 38. Switches 28, 36 and 37 are interconnected so that when switch 28 is closed, switches 36 and 37 are open, as shown in FIG. 1, and when switch 28 is open, switches 36 and 37 are closed.

When switches 36 and 37 are closed, write electrode 18 is grounded and a voltage is impressed between write electrode 18 and counter electrode 12. This causes an electric charge to be trapped at the interface between upper layer 16 and lower layer 14, as indicated by the "30" signs at this interface. The trapped charge at the interface causes an electric field to exist in the air gap 25 as indicated by the arrows therein. One of the advantages of transducer device 10 is that the charge density at the interface of silicon-nitride layer 18 and silicon-oxide layer 16 will be in the order of $10^{-6}$ coulombs/cm$^2$, or two orders of magnitude greater than the prior art devices. This, in turn, renders transducer device 10 much more sensitive and hence, much less costly signal detecting equipment is needed therewith. It should be noted that the polarity of battery 38 may be reversed and the stored charge will merely change polarity, but the device operation will remain the same.

When flexible electrode 20 is moved by, for instance, an acoustical wave or physical contact therewith, the capacitance of the transducer device 10 will be changed as the effective distance between the metalized layer 22 of flexible electrode 20 and counter electrode 12 is changed. Since the electric charge at the interface of upper layer 15 and lower layer 14 remains substantially constant over a long duration of time (years), the voltage between metalized layer 22 and counter electrode 12 changes in proportion to the capacitance change due to the equation V=Q/C, where V is a voltage, Q is charge and C is capacitance. Thus, when switches 36 and 37 are opened and switch 28 is closed, the voltage across load 30 is a direct indication of the force applied to flexible electrode 20, and, in this manner, the device may be used to convert mechanical energy into electric energy.

Figure 2:
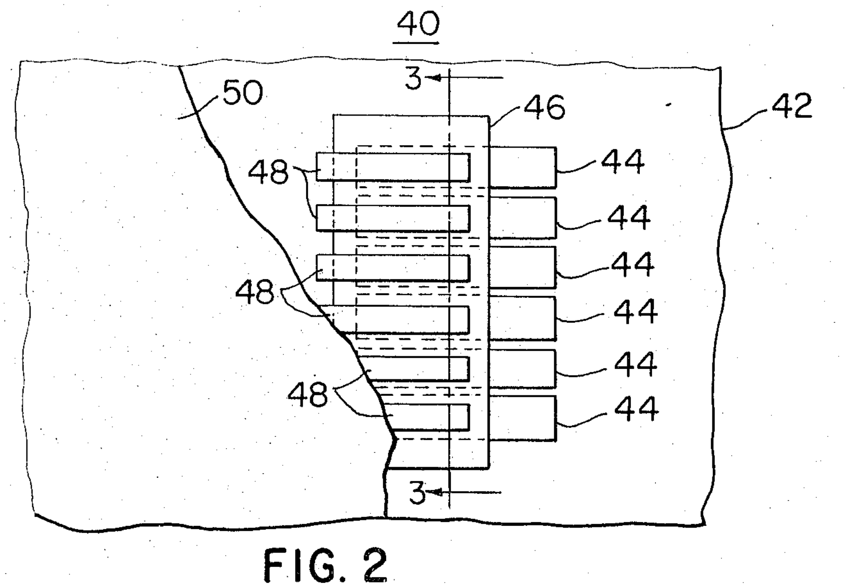
FIG. 2 shows a manually actuated programmable code providing device utilizing the transducer shown in FIG. 1.

Referring now to FIG. 2, there is shown a manually actuated programmable code providing device 40 utilizing the concepts of this invention. Device 40 may be used, for instance, as part of one key of a keyboard and the flexible electrode is operated in response to an operator manually depressing it or a member brought into contact with it by the depression, thereby causing the air gap distance to vary. Device 40 includes a substrate 42 of any suitable material upon which is placed a given number, such as six, of counter electrodes 44. Over the substrate 42 and counter electrodes 44 is affixed the silicon-oxide silicon-nitride insulator material 46. This insulator material is offset from one edge of the counter electrodes 44 and overlaps the other edge of counter electrodes 44, as shown in FIG. 2. Placed on top of insulator 46 is a given number, such as six, of write electrodes 48, each of which is aligned over a corresponding counter electrode 44. Write electrodes 48 are offset on one edge from insulator layer 46. The offsetting of the counter electrodes 44 and write electrodes 48 allows voltages to be applied therebetween or to be sensed therefrom when conventional integrated circuit connections (not shown) are connected thereto.

Over the entire structure of counter electrodes 44, insulator layer 46, and write electrodes 48 is placed the flexible electrode 50 which is illustrated in a partially cutaway manner. Flexible electrode 50 includes a flexible metalized layer (not shown in FIG. 2) and a flexible insulator layer (not shown in FIG. 2).

Figure 3:
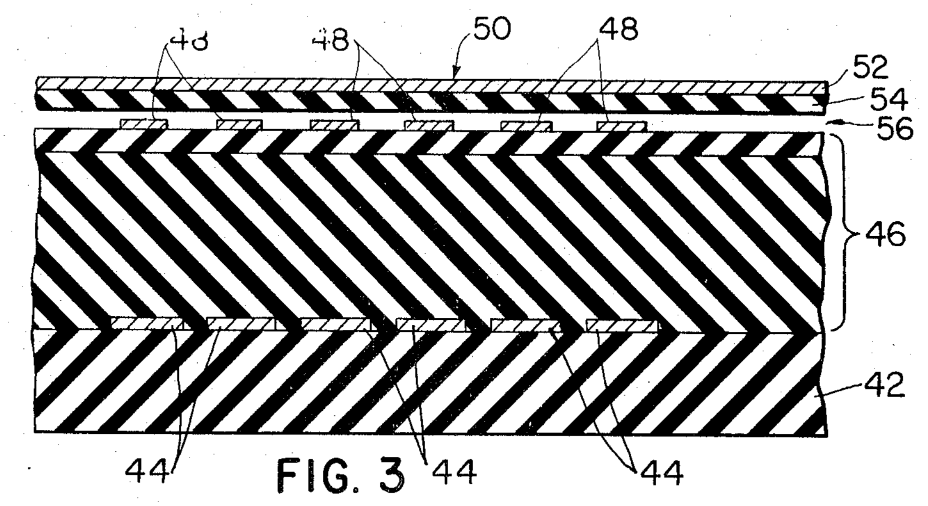
FIG. 3 shows a view taken across the line 3—3 of the device shown in FIG. 2.

Referring to FIG. 3 there is shown a view taken across lines 3—3 of FIG. 2 in which the position of the counter electrodes 44, insulator layer 46, conductor layers 48 and flexible electrode 50 is seen. Flexible metalized layer 52 and flexible insulator layer 54 of flexible electrode 50 are also shown in FIG. 3, as is air gap 56.

Referring again to FIG. 2, device 40 may be utilized as a key of a keyboard by merely applying a voltage between selected ones of the counter electrodes 44 and the write electrode 48 in the manner shown in FIG. 1 with respect to the lead 34, switch 36, battery 38, and lead 39 circuit. If, for instance, a character having a binary code 110000 is desired, the two upper counter electrodes 44 and the two upper write electrodes 48 will have a voltage applied therebetween and the lower four electrodes will not. This will cause charge to be trapped at the interface in insulator layer 46 only beneath the two upper write electrodes 48. Thus, when a depression is made in flexible electrode 50, a voltage change will be sensed between the two upper counter electrodes 44 and the conductor portion of flexible electrode 50, but not between the four lower counter electrodes 44 and the conductor portion of flexible electrode 50. This signifies that the digital output of the device is 110000, as desired.

It is apparent that the device described herein has many other uses in the area where it is desired to detect a mechanical motion and convert it into an electric signal, such as a surface wave detector or a microphone. It is believed adaptation of this device to these uses is within the state of the art.

What is claimed is:

1. An electrically alterable stored charge transducer comprising:

a first layer of an insulator material;

a second layer of an insulator material affixed to said first layer, said first and second insulator materials being selected so that trapped charge is capable of existing at the interface thereof;

a first conductor layer affixed to said second layer so as to be separated from said first layer by said second layer; and a flexible conductor layer means positioned in proximity to said first conductor layer in such a manner that a gap exists between said first conductor layer and said flexible conductor layer means.

2. The invention according to claim 1 wherein said flexible conductor layer means includes a flexible insulator layer and a flexible conductor layer affixed to said flexible insulator layer, said flexible conductor layer being separated from said first conductor layer by said flexible insulator layer and said gap.

3. The invention according to claim 1 wherein said transducer further includes an electrode affixed to said first insulator layer and separated from said second insulator layer by said first insulator layer, the output of said transducer being the voltage between said electrode and flexible conductor layer means.

4. The invention according to claim 3 wherein a source of voltage is capable of being connected between said electrode and said first conductor layer to cause the magnitude of the trapped charge at said interface to increase so as to cause an electric field to exist in said air gap.

5. The invention according to claim 1 wherein said first layer of insulator layer is much thicker than said second layer of insulator material.

6. The invention according to claim 1 wherein said gap exists as a result of surface irregularities of said first conductor layer and said flexible conductor layer means.

7. The invention according to claim 1 wherein one of said first or second insulator layers is silicon oxide and the other one of said first or second insulator layers is silicon nitride.

8. A manually actuated programmable code providing device for providing a digital signal comprising:

a plurality of first conductor layers each electrically isolated from one another;

at least one insulator layer capable of having a predetermined amount of trapped charge programmed therein, said insulator being affixed to each of said plurality of first conductor layers;

a plurality of second conductor layers each affixed to said insulator layer and positioned on said insulator layer so as to be aligned above a corresponding one of said first conductor layers, each of said second conductor layers being separated from the first conductor layers corresponding thereto by said insulator layer; and a flexible conductor layer positioned above each of said plurality of second conductor layers and separated therefrom by a gap, said gap varying in response to the manual operation of said device.

9. The invention according to claim 8:

wherein said plurality of first conductor layers are affixed to a substrate and aligned substantially parallel to one another; and wherein said insulator layer is further affixed to said substrate and positioned so that only a portion of each of said first conductor layers are affixed to said insulator layer.

10. The invention according to claim 9:

wherein said device stores the digital signal it is to provide; and wherein each digit of said code is caused to be stored by selectively applying a voltage between corresponding ones of said first and second conductors.

11. The invention according to claim 10 wherein said insulator layer includes a layer of silicon oxide and a layer of silicon nitride.

12. The invention according to claim 11:

wherein one of said layer of silicon oxide and said layer of silicon nitride is much thicker than the other layer, said second conductor layers being affixed to said other layer and said first conductor layers being affixed to said one layer; and wherein said selectively applied voltage causes electric charge to be trapped at the interface of said silicon oxide and silicon nitride layers in a position substantially aligned between corresponding first and second conductor layers having the voltage applied therebetween.

13. The invention according to claim 12 wherein said digital signal is detected by measuring the voltage change between each first conductor layers and said flexible conductor whenever said manual operation occurs.

14. The invention according to claim 13 wherein said flexible conductor layer includes a metalized layer of insulator material positioned so that said metalized portion is separated from said gap by said insulator portion.

15. A transducer comprising:

a layer of electrically insulating material having an alterable trapped charge therein;

a first layer of an electrically conductive material disposed and affixed to the layer of electrically insulating material; and a second layer of an electrically conductive material disposed in a spaced relationship with the first layer of electrically conductive material to define an air gap therebetween, the second layer having flexible properties;

an electric field generated by the alterable trapped charge existing in the air gap; and means for altering the magnitude of the trapped charge in the layer of insulator material to alter the intensity of the electric field in the air gap.

16. The invention according to claim 15 wherein said layer of insulating material includes a first insulator material layer affixed to said first layer of electrically conductive material and a second insulator material layer disposed on and affixed to said first insulator material layer so as to be separated from said other conductor layer by the thickness of said first insulator material layer, said first and second materials being selected so that trapped charge is capable of existing at the interface therebetween.

* * * * *

UNITED STATES PATENT OFFICE
CERTIFICATE OF CORRECTION

Patent No. 3,786,495 Dated January 15, 1974

Inventor(s) Wendell Spence

It is certified that error appears in the above-identified patent and that said Letters Patent are hereby corrected as shown below:

Column 4, line 59, after "insulator" insert -- layer --.

Signed and sealed this 23rd day of April 1974.

(SEAL)
Attest:

EDWARD M.FLETCHER,JR.
Attesting Officer

C. MARSHALL DANN
Commissioner of Patents

USCOMM-DC 60376-P69
U.S. GOVERNMENT PRINTING OFFICE 1969 O-366-334